US012776152B2

(12) United States Patent
Gangirevula et al.

(10) Patent No.: US 12,776,152 B2
(45) Date of Patent: *Oct. 27, 2026

(54) APPARATUS AND METHOD FOR DETECTING CONTENT OF INTEREST ON A SLIDE USING MACHINE LEARNING

(71) Applicant: Pramana, Inc., Cambridge, MA (US)

(72) Inventors: Parveen Shaik Gangirevula, Bengaluru (IN); Prasanth Perugupalli, Cary, NC (US); Raghubansh Bahadur Gupta, Bangalore (IN); Sai Pranav Varada Raghunath, Bengaluru (IN); Venkata Veera Lokesh Kumar Puvvada, Guntur (IN); Manish Shiralkar, Pune (IN)

(73) Assignee: Pramana, Inc., Cambridge, MA (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/949,518

(22) Filed: Nov. 15, 2024

(65) Prior Publication Data

US 2025/0378700 A1 Dec. 11, 2025

Related U.S. Application Data

(63) Continuation of application No. 18/736,818, filed on Jun. 7, 2024, now Pat. No. 12,217,520.

(51) Int. Cl.

| | |
|---|---|
| ***G06V 10/25*** | (2022.01) |
| ***G02B 21/36*** | (2006.01) |
| ***G06V 10/82*** | (2022.01) |
| ***G06V 20/69*** | (2022.01) |

(52) U.S. Cl.

CPC ......... *G06V 20/693* (2022.01); *G02B 21/365* (2013.01); *G06V 10/25* (2022.01); *G06V 10/82* (2022.01); *G06V 20/698* (2022.01)

(58) Field of Classification Search

CPC ...... G02B 21/365; G06V 10/25; G06V 10/82; G06V 20/693; G06V 20/698; G06V 2201/03

USPC ........................................................ 348/79

See application file for complete search history.

(56) References Cited

U.S. PATENT DOCUMENTS

| | | | |
|---|---|---|---|
| 6,993,169 | B2 | 1/2006 | Wetzel et al. |
| 9,939,381 | B1 | 4/2018 | Kimmel et al. |
| 10,192,099 | B2 | 1/2019 | Agaian et al. |
| 10,453,195 | B2 | 10/2019 | Gholap et al. |
| 10,761,310 | B2 | 9/2020 | Bredno et al. |

(Continued)

*Primary Examiner* — Kathleen M Walsh
(74) *Attorney, Agent, or Firm* — CALDWELL LLC

(57) ABSTRACT

An apparatus and method for detecting content of interest on a slide using machine learning. The apparatus includes at least a processor and a memory communicatively connected to the at least a processor. The memory instructs the processor to receive a first image, comprising a macro image, identify areas of interest associated with the grids of the first image, receive a second image comprising a high magnification image associated with the areas of interest of the first image, classify, using at least a probed point, the grids of the first image, wherein classifying the grids of the first image includes classifying the grids into accepted grids of the grids and rejected grids of the grids, scan, using the image capturing device, the accepted grids to generate an output image, and display, using a display device, the output image.

20 Claims, 9 Drawing Sheets

(56) References Cited

U.S. PATENT DOCUMENTS

| | | | | |
|---|---|---|---|---|
| 11,983,845 | B1 * | 5/2024 | Frank | G06F 3/04842 |
| 12,217,520 | B1 * | 2/2025 | Gangirevula | G06V 10/25 |
| 2020/0349707 | A1 | 11/2020 | Hosseini et al. | |
| 2021/0090238 | A1 | 3/2021 | Gallagher-Gruber et al. | |
| 2021/0224541 | A1 | 7/2021 | Stumpe | |
| 2021/0264595 | A1 * | 8/2021 | Plesch | G06T 7/0012 |
| 2022/0028068 | A1 | 1/2022 | Cosatto et al. | |
| 2022/0076411 | A1 * | 3/2022 | Georgescu | G06V 10/82 |
| 2022/0084660 | A1 | 3/2022 | Georgescu et al. | |
| 2023/0056839 | A1 | 2/2023 | Ce-Ougna et al. | |
| 2023/0186659 | A1 | 6/2023 | Martin et al. | |
| 2023/0281819 | A1 | 9/2023 | Smith et al. | |
| 2023/0377155 | A1 | 11/2023 | Raharja et al. | |
| 2023/0419600 | A1 | 12/2023 | Fanello et al. | |

* cited by examiner

APPARATUS AND METHOD FOR DETECTING CONTENT OF INTEREST ON A SLIDE USING MACHINE LEARNING

CROSS-REFERENCE TO RELATED APPLICATIONS

This application is a continuation of Non-provisional application Ser. No. 18/736,818 filed on Jun. 7, 2024, and entitled "APPARATUS AND METHOD FOR DETECTING CONTENT OF INTEREST ON A SLIDE USING MACHINE LEARNING", the entirety of which is incorporated herein by reference.

FIELD OF THE INVENTION

The present invention generally relates to the field of medical imaging. In particular, the present invention is directed to an apparatus and a method for detecting content of interest on a slide using machine learning.

BACKGROUND

Whole slide imaging (WSI) of glass slides necessitates scanning all areas of interest at high magnification to ensure comprehensive analysis. Simultaneously, it is crucial to avoid scanning regions that are not of interest to optimize scan time and resource efficiency. There is a need for efficient implementation of grid rejection and grid extension techniques to reduce scan time, prevent the omission of faint peripheral tissues, and ensure accurate localization and confident classification of tissue segments using macro images and high magnification data.

SUMMARY OF THE DISCLOSURE

In an aspect, an apparatus for detecting content of interest on a slide is described. The apparatus includes an image capturing device, wherein the image capturing device is configured to capture at least an image of a received slide. The apparatus further includes at least a computing device, wherein the computing device includes a memory and at least a processor communicatively connected to the memory, wherein the memory contains instructions configuring the at least a processor to receive a first image of the at least an image from the image capturing device, identify one or more areas of interest associated with one or more grids of the first image, classify, using at least a probed point, the one or more grids of the first image, wherein classifying the one or more grids of the first image includes classifying the one or more grids into accepted grids of the one or more grids and scan, using the image capturing device, the accepted grids to generate an output image. The apparatus further includes a grid extension model configured to scan the one or more grids of an area of interest, wherein scanning the one or more grids includes identifying a border row and a border column of the one or more grids and conditionally extending the border row and the border column of the area of interest as a function of whether the border row and the border column includes a content of interest.

In another aspect, a method for detecting content of interest on a slide is described. The method includes receiving, by at least a processor, a first image from an image capturing device, identifying, by the at least a processor, one or more areas of interest associated with one or more grids of the first image, classifying, by the at least a processor, using at least a probed point, the one or more grids of the first image, wherein classifying the one or more grids of the first image includes classifying the one or more grids into accepted grids of the one or more grids and scanning, using a grid extension model, the one or more grids of an area of interest, wherein scanning the one or more grids includes identifying a border row and a border column of the one or more grids and conditionally extending the border row and the border column of the area of interest as a function of whether the border row and the border column includes a content of interest. The method further includes scanning, using the image capturing device, the accepted grids to generate an output image.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for detecting content of interest on a slide using machine learning. The apparatus includes at least a computing device comprised of a processor and a memory communicatively connected to the processor. The memory instructs the processor to receive a first image of the at least an image from the image capturing device, wherein the first image comprises a macro image. The processor identifies one or more areas of interest associated with the one or more grids of the first image. The processor receives a second image of the at least an image from the image capturing device, wherein the second image comprises a high magnification image associated with the one or more areas of interest of the first image. The processor classifies, using at least a probed point, the one or more grids of the second image, wherein classifying the plurality of grids of the second image comprises classifying the plurality of grids into accepted grids of the plurality of grids and rejected grids of the plurality of grids. The processor scans, using the image capturing device, the accepted grids of the second image. The processor displays, using a display device, an output image.

Figure 1:
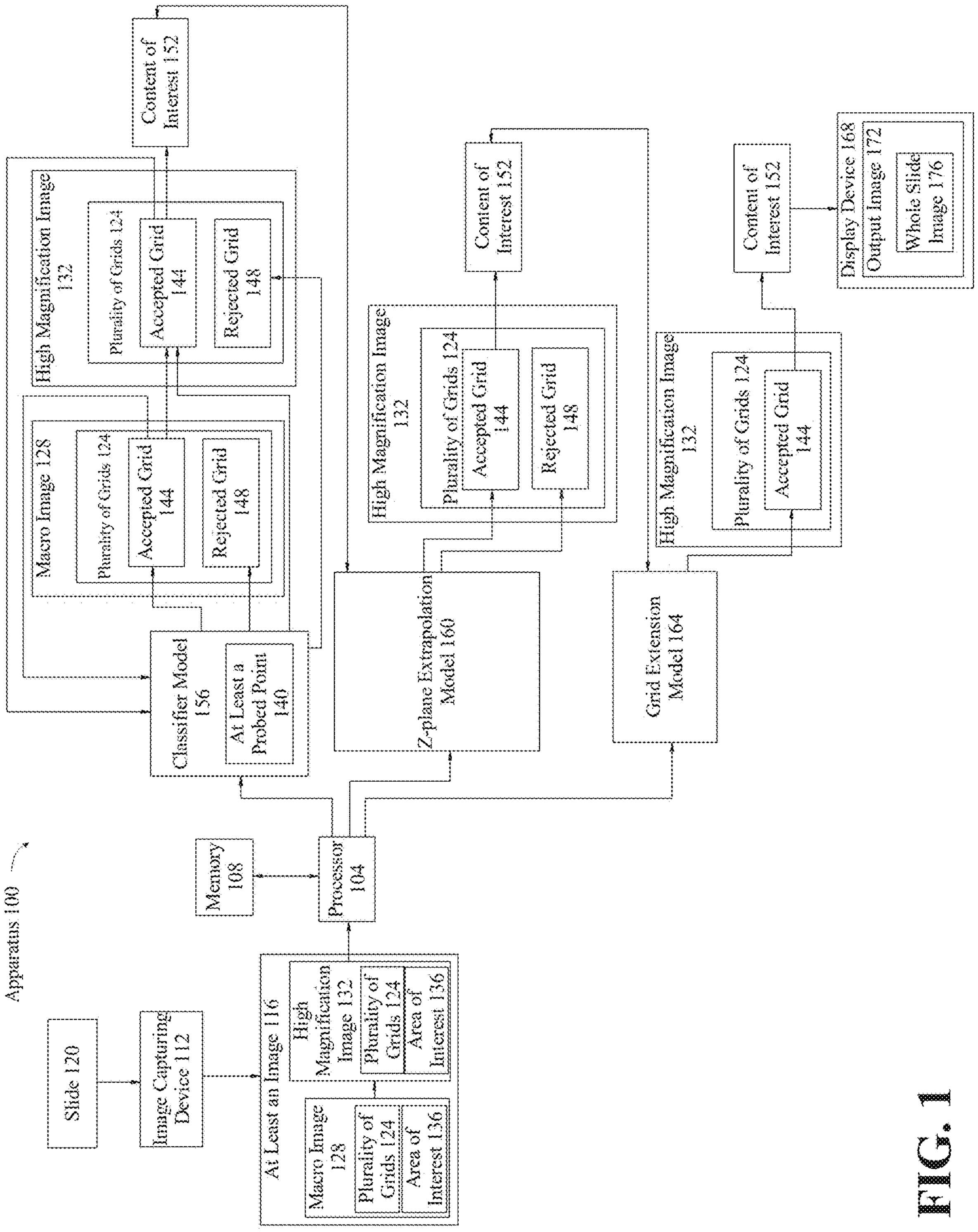
FIG. 1 is a block diagram of an apparatus for detecting content of interest on a slide using machine learning.

Referring now to FIG. 1, an exemplary embodiment of apparatus 100 for detecting content of interest on a slide using machine learning is illustrated. Apparatus 100 may include a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 includes image capturing device 112, wherein image capturing device 112 is configured to capture at least an image 116 of a received slide, wherein the at least an image comprises a plurality of grids. As used in this disclosure, an "image capturing device" is a device that is designed to create a digitalized visual of a real life element. Image capturing device 112 may include, and is not limited to, an optical scanner, a video capture device (e.g., a still camera, a video camera), and any combinations thereof. In a non-limiting embodiment, image capturing device 112 may include the use of a Pramana scanner to digitalize a pathology slide image wherein processor 104 may receive the digitalized pathology slide image as a function of the Pramana scanner.

In some embodiments, apparatus 100 may include at least an optical system. As used in this disclosure, an "optical system" is an arrangement of one or more components which together act upon or employ electromagnetic radiation. In non-limiting examples, electromagnetic radiation may include light, such as visible light, infrared light, UV light, and the like. An optical system may include one or more optical elements, including without limitation lenses, mirrors, windows, filters, and the like. An optical system may form an optical image that corresponds to an optical object. For instance, an optical system may form an optical image at or upon an optical sensor, which can capture, e.g., digitize, the optical image. In some cases, optical system may have at least a magnification. For instance, optical system may include an objective (e.g., microscope objective) and one or more reimaging optical elements that together produce an optical magnification. In some cases, optical magnification may be referred to herein as zoom. As used herein, an "optical sensor" is a device that measures light and converts the measured light into one or more signals; one or more signals may include, without limitation, one or more electrical signals. In some embodiments, the optical sensor may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, the optical sensor may include a plurality of photodetectors. The optical sensor may include, without limitation, a camera. The optical sensor may be in electronic communication with at least a processor 104 of apparatus 100. As used herein, "electronic communication" as used in this disclosure is a shared data connection between two or more devices. In some embodiments, apparatus 100 may include two or more optical sensors.

With continued reference to FIG. 1, as used herein, "at least an image" is information representing at least a physical scene, space, and/or object. Image data may include, for example, information representing a sample, slide, or region of a sample or slide. In some cases, image data may be generated by a camera. "Image data" may be used interchangeably through this disclosure with "image," where image is used as a noun. An image may be optical, such as without limitation where at least an optic is used to generate an image of an object. An image may be digital, such as without limitation when represented as a bitmap. Alternatively, an image may include any media capable of representing a physical scene, space, and/or object. Alternatively, where "image" is used as a verb, in this disclosure, it refers to generation and/or formation of an image.

With continued reference to FIG. 1, as used in this disclosure, a "slide" refers to a flat, transparent material in which a specimen may be observed. As used in this disclosure, a slide refers to an entire sample and/or specimen on a slide. Slide 120 provides a macroscopic view of the specimen and is typically used for initial inspection and/or characterization. As used in this disclosure, a "grid" refers to a smaller region or segmented region of an image that provides a more detailed view of the specimen. In some embodiments, grids may be segmented regions of a macro image; however, the grid may represent the entire FOV of a high magnification image. In a non-limiting example, the tissue content on slide 120 may be identified and segmented into rectangular bounding box regions, wherein the rectangular bounding box regions are grids. In a non-limiting example, image 116 components may be characterized based on composition while being imaged to generate a Whole Slide Image (WSI). As used in this disclosure, a "Whole Slide Image" is a digital image of a glass slide with a specimen sample. In a non-limiting example, whole slide image 176 may be used in digital pathology and may use a high-resolution scanner. In a non-limiting example, whole slide image 176 may be viewed digitally, managed, and analyzed on a computing device. In some embodiments, generating whole slide image may include stitching together or otherwise compositing together a plurality of high-magnification images that have been deemed "accepted" using the processes disclosed in this application.

With continued reference to FIG. 1, image capturing device 112 may be further configured to capture, using a macro imaging setup, macro image of the at least an image 116 of the received slide 120 and capture, using a high magnification imaging setup, high magnification image 132 of the at least an image 116 of the received slide 120. As used in this disclosure, a "macro imaging setup" refers to the arrangement of equipment and techniques used to capture macro images. As used in this disclosure, a "macro image" is a high resolution, large-scale image that captures detailed structural features. In a non-limiting example, macro image 128 may include a plurality of grids. In a non-limiting example, macro image 128 may include images for tissue analysis. In a non-limiting example, macro image 128 may include high pixel density to ensure that minute details of the tissue structure are visible upon magnification. In another non-limiting example, macro image 128 may include some ambiguity in segmenting some portions of the tissue that are very faint. Without limitation, one or more grids of plurality of grids 124 of macro image 128 may include false positive results and non-tissue segments.

With continued reference to FIG. 1, as used in this disclosure, a "high magnification imaging setup" refers to the arrangement of equipment and techniques used to capture high magnification images. As used in this disclosure, a "high magnification image" is a high resolution, large-scale image that is captured at a significant magnification level with a greater magnification level than a macro image. In a non-limiting example, high magnification image 132 may include plurality of grids 124. In a non-limiting example, high magnification image 132 may include magnification levels ranging from 400× to 1000×. In a non-limiting example, high magnification image 132 may include high resolution that enables the visualization of minute details within a tissue specimen, such as an individual cell, cell nuclei, organelles, intracellular structures, and the like. In a non-limiting example, when the high magnification imaging setup is initiated, high magnification image 132 may be evaluated using sampling inside one or more grids of plurality of grids 124 to determine whether the grid corresponds to tissue or not. In an embodiment, without limitation, adjacent grids may have very different Z-planes associated with them and outlier grids are identified and rejected as discussed in more detail below. Additionally, and or alternatively, while scanning one or more grids of plurality of grids 124 of high magnification image 132, apparatus 100 may identify that the boundary of the grid has tissue content wherein the grid may be extended in that direction to avoid missing any tissue while scanning as discussed more herein.

Still referring to FIG. 1, processor 104 identifies one or more areas of interest 136 associated with one or more grids 124 of the first image. For the purposes of this disclosure, an "area of interest" is a region of a scene or environment that is selected or desired to be positioned within a line of sight and, thus, a Field of view of an optical component of an optical system that contains a portion of the specimen that is desired to be imaged. As used in this disclosure, "line of sight", is a line along which an observer or lens has unobstructed vision. A "field of view (FOV)", for the purposes of this disclosure, is an angle through and/or an area within which an optical component detects electromagnetic radiation. For instance, and without limitation, FOV may indicate an area of a scene that may be captured by an optical component within defined bounds (e.g., a frame) of an image. For example, and without limitation, an area of interest 136 within FOV of optical system may include a scene desired to be captured in an image by being placed within a line of sight of a lens of optical system, so that image may be captured. FOV may include vertical and horizontal angles that project relative to the surface of a lens of an optical component. In one or more embodiments, line of sight may include an optical access of the FOV. In various embodiments, an area of interest 136 may include at least a portion of the specimen. In some embodiments, an area of interest 136 may include a portion of the specimen and a portion of slide 120. In a non-limiting example, area of interest 136 may include a specific region or segment of slide 120 that has been identified for detailed examination and analysis. In a non-limiting example, area of interest 136 may be singled out for closer scrutiny.

With continued reference to FIG. 1, a "first image" is an initial image captured using an image capturing device. In a non-limiting example, the first image may include macro image 128. In another non-limiting example, the first image may include plurality of grids 124. In another non-limiting example, the first image may include area of interest 136.

Still referring to FIG. 1, processor 104 receives a second image of at least an image 116 from image capturing device 112, wherein the second image comprises high magnification image 132 associated with one or more areas of interest 136 of the first image. As used in this disclosure, a "second image" is a subsequent image of the same specimen. In a non-limiting example, the second image may include the same specimen or subject under different conditions or settings. In a non-limiting example, the second image may be required to capture additional details and/or perspectives of the specimen under analysis. For example, without limitation, the second image may include a different magnification level to provide broader context or a more detailed view of the particular area. For example, a tissue specimen may be captured at macro image 128 in the first image and then captured again as high magnification image 132 in the second image to provide a more detailed view of the one or more areas of interest 136 of the first image of the tissue specimen on slide 120. Without limitation, the second image may include different focus planes, different lighting conditions, different angles or orientations, different imaging techniques, and the like.

Still referring to FIG. 1, apparatus 100 may include an image processing module to determine one or more areas of interest 136. As used in this disclosure, an "image processing module" is a component designed to process digital images. In an embodiment, image processing module may include a plurality of software algorithms that can analyze, manipulate, or otherwise enhance an image, such as, without limitation, a plurality of image processing techniques as described below. In another embodiment, image processing module may include hardware components such as, without limitation, one or more graphics processing units (GPUs) that can accelerate the processing of large amount of images. In some cases, image processing module may be implemented with one or more image processing libraries such as, without limitation, OpenCV, PIL/Pillow, ImageMagick, and the like.

Still referring to FIG. 1, image processing module may be configured to receive images from image capturing device 112. One or more images may be transmitted, from image capturing device 112 to image processing module, via any suitable electronic communication protocol, including without limitation packet-based protocols such as transfer control protocol-internet protocol (TCP-IP), file transfer protocol (FTP) or the like.

Still referring to FIG. 1, in an embodiment, processing images may include determining a degree of quality of depiction of a region of interest of an image. In an embodiment, image processing module may determine a degree of blurriness of images. In a non-limiting example, image processing module may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module may be configured to rank images according to degree of quality of depiction of a region of interest and select a highest-ranking image from a plurality of images.

Still referring to FIG. 1, processing images may include enhancing an image or at least a region of interest via a plurality of image processing techniques to improve the quality (or degree of quality of depiction) of an image for better processing and analysis as described further in this disclosure. In an embodiment, image processing module may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module, by averaging or filtering out pixel values in neighborhood of each pixel of an image to reduce random variations.

Still referring to FIG. 1, in another embodiment, image processing module may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Image processing module may be configured to adjust the brightness and darkness levels within an image to make a feature more distinguishable (i.e., increase degree of quality of depiction). Additionally, or alternatively, image processing module may be configured to perform a brightness normalization operation to correct variations in lighting conditions (i.e., uneven brightness levels). In some cases, an image may include a consistent brightness level across a region after brightness normalization operation performed by image processing module. In a non-limiting example, image processing module may perform a global or local mean normalization, where the average intensity value of an entire image or region of an image may be calculated and used to adjust the brightness levels.

Still referring to FIG. 1, in other embodiments, image processing module may be configured to perform a color space conversion operation to increase degree of quality of depiction. In a non-limiting example, in case of a color image (i.e., RGB image), image processing module may be configured to convert RGB image to grayscale or HSV color space. Such conversion may emphasize the differences in intensity values between a region or feature of interest and the background. Image processing module may further be configured to perform an image sharpening operation such as, without limitation, unsharp masking, Laplacian sharpening, high-pass filtering, and/or the like. Image processing module may use image sharpening operation to enhance the edges and fine details related to a region or feature of interest within an image by emphasizing high-frequency components within an image.

Still referring to FIG. 1, processing images may include isolating a region or feature of interest from the rest of an image as a function of plurality of image processing techniques. Images may include highest-ranking image selected by image processing module as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating area of interest 136 from at least an image 116 may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating area of interest 136 from at least an image 116 may include applying a closing operation, wherein the closing operation is a basic morphological operation configured to fill in small gaps or holes in objects in an image while preserving the overall shape and size of the objects. These morphological operations may be performed by image processing module to enhance the edges of objects, remove noise, or fill gaps in a region or feature of interest before further processing.

Still referring to FIG. 1, in an embodiment, isolating area of interest 136 from at least an image 116 may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Still referring to FIG. 1, in a non-limiting example isolating area of interest 136 from at least an image 116 may include determining a feature of interest via edge detection technique. A feature of interest may include a specific area within a digital image that contains information relevant to further processing as described below. In a non-limiting example, image data located outside a feature of interest may include irrelevant or extraneous information. Such portion of an image containing irrelevant or extraneous information may be disregarded by image processing module, thereby allowing resources to be concentrated at a feature of interest. In some cases, feature of interest may vary in size, shape, and/or location within an image. In a non-limiting example feature of interest may be presented as a circle around the nucleus of a cell. In some cases, feature of interest may specify one or more coordinates, distances and the like, such as center and radius of a circle around the nucleus of a cell in an image. Image processing module may then be configured to isolate feature of interest from the image based on feature of interest. In a non-limiting example, image processing module may crop an image according to a bounding box around a feature of interest.

Still referring to FIG. 1, image processing module may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module as feature of interest, while other components may be discarded. Image processing module may be further configured to extract feature of interest from an image for further processing as described below.

Still referring to FIG. 1, in an embodiment, isolating area of interest 136 from at least an image 116 may include segmenting a region depicting a feature of interest into a plurality sub-regions. Segmenting a region into sub-regions may include segmenting a region as a function of feature of interest and/or CCA via an image segmentation process. As used in this disclosure, an "image segmentation process" is a process for partition a digital image into one or more segments, where each segment represents a distinct part of the image. Image segmentation process may change the representation of images. Image segmentation process may be performed by image processing module. In a non-limiting example, image processing module may perform a region-based segmentation, wherein the region-based segmentation involves growing regions from one or more seed points or pixels on an image based on a similarity criterion. Similarity criterion may include, without limitation, color, intensity, texture, and/or the like. In a non-limiting example, region-based segmentation may include region growing, region merging, watershed algorithms, and the like.

With continued reference to FIG. 1, in a non-limiting example, image processing module may use machine vision processes that are the same or substantially similar to the machine vision processes described in U.S. patent application Ser. No. 18/384,840, filed on Oct. 28, 2023, titled "APPARATUS AND METHODS FOR SLIDE IMAGING," which is incorporated by reference herein in its entirety.

Still referring to FIG. 1, processor 104 classifies, using at least a probed point 140, one or more grids of the second image, wherein classifying the plurality of grids 124 of the second image comprises classifying plurality of grids 124 into accepted grids of plurality of grids 124 and rejected grids of plurality of grids 124. As used in this disclosure, a "probed point" is a specific point or grid within the plurality of grids on a specimen that is investigated. In a non-limiting example, probed point 140 may include one or more points. In a non-limiting example, probed points 140 are sample points that are selected by a user from macro image 128 based on maximizing the probability of finding content of interest 152 of an area of interest 136 in high magnification image 132. In a non-limiting example, one or more grids of plurality of grids 124 may contain a probed point 140.

Without limitation, one or more grids may include one or more areas of interest 136. In a non-limiting example, one or more grids may include accepted grids 144 or rejected grids 148. As used in this disclosure, an "accepted grid" is a grid that may be subject to further analysis by an apparatus due to a specific condition being present or a specific condition being absent in the grid. In a non-limiting example, accepted grid 144 may include an area of interest 136. In a non-limiting example, accepted grid may be subject to further scanning by apparatus 100 as described in more detail below. In another non-limiting example, accepted grid 144 may be subject to further analysis where a once accepted grid 144 is later reclassified as rejected grid 148 due to the presence or omission of specific information in the grid.

With continued reference to FIG. 1, as used in this disclosure, a "rejected grid" is a grid that is no longer being analyzed by an apparatus due to a specific condition being present or a specific condition being absent in the grid. In a non-limiting example, rejected grid 148 may not be within a predetermined Z-plane differential as described below. In another non-limiting example, rejected grid 148 may include no content of interest 152. As used in this disclosure, "content of interest" is a specific element that is relevant and significant to a particular analysis. In a non-limiting example, the tissue specimen may be the content of interest 152 of slide 120 with a tissue specimen, debris, and pen marking. In another non-limiting example, a specific type of cell tissue or the tissue specimen may be defined as content of interest 152. Without limitation, identifying content of interest 152 on slide 120 may provide a focused analysis of the specimen and thereby a more efficient analysis.

With continued reference to FIG. 1, apparatus 100 may be further configured to utilize classifier model 156, wherein classifier model 156 is configured to classify using at least a probe point 140 from macro image 128 and high magnification image 132, content of interest 152 of area of interest 136 as accepted grid 144 or rejected gird 148. As used in this example, a "classifier model" is a model designed to classify elements of similar characteristics into specific groups. In a non-limiting example, classifier model may be trained on labeled datasets, where each input is associated with a corresponding class label, where classifier model 156 may learn the patterns and features that distinguish one class from another class. In a non-limiting example, classifier model 156 may classify the grid of plurality of grids 124 of at least an image 116 as either accepted grid 144 or rejected grid 148. Classifier model 156 may first analyze macro image 128 plurality of grids 124 and then classifier model 156 may analyze accepted grid 144 of macro image 128 at high magnification using high magnification image 132. Continuing the previous example, without limitation, analyzing plurality of grids 124 of macro image 128 and then high magnification image 132 may reduce analyzing time and provide more accurate results because macro image 128 analysis provides an initial classification of plurality of grids 124 and high magnification image 132 may include a smaller subset of grids to analyze of plurality of grids 124 to obtain content of interest 152. In a non-limiting embodiment, high magnification image 132 helps in obtaining content of interest 152 by providing detailed analysis of the smaller subset of grids identified in macro image 128. In an embodiment, without limitation, analyzing plurality of grids 124 in macro image 128 first, followed by high magnification image 132 analysis of plurality of grids 124 reduces overall analysis time because the two-step process initially processes a broader, lower-resolution view of the specimen to identify relevant areas, thereby limiting high-resolution, time-intensive analysis to smaller subset of plurality of grids 124.

With continued reference to FIG. 1, apparatus 100 comprises a machine learning model, wherein the machine learning model is trained using the plurality of macro images and high magnification images and a labeled dataset to classify the content of interest as accepted grid 144 or rejected grids 148. In some embodiments, training set may include labeled high magnification images. In some embodiments, training set may include labeled macro images. In some embodiments, training set may include labeled images. In a non-limiting example, a "labeled dataset" may include a plurality of macro images and high magnification images containing a plurality of grids 124 where the grids are labeled. Ins some embodiments, grids may be labeled as accepted grids 144 or rejected grids 148 to distinguish between one or more areas of interest 136 and content of interest 152, such as, without limitation, pen mark and tissue cells respectively. In some embodiments, grids may be labeled based on their contents, such as cells, type of cell, pen mark, debris, or the like. In a non-limiting example, one or more machine learning models may be included in apparatus 100. In a non-limiting example, apparatus 100 may include classifier model 156 that is specialized in determining grids containing content of interest 152 in macro image 128. Continuing the previous non-limiting example, classifier model 156 used to analyze macro image 128 may be trained on a plurality of macro images to detect a specified content of interest 152 such as, without limitation, tissue cells. In another non-limiting example, a separate classifier model 156 may be used to determine grids containing content of interest 152 in high magnification image 132. In some cases, classifier for high-magnification images may be configured to take high-magnification images and assign labeled depending on what the images contain. Continuing the previous non-limiting example, classifier model 156 may utilize a plurality of high magnification images as training data.

With continued reference to FIG. 1, in another non-limiting example, classifier model 156, Z-plane extrapolation model 160, and/or grid extension model 164 may include a machine learning model, as described in more detail in FIG. 5 below. Additionally and or alternatively, the machine learning model comprises a neural network. As used in this disclosure, a "neural network" is a computational model consisting of interconnected nodes organized in layers as further discussed in FIG. 6 and FIG. 7. In a non-limiting example, classifier model 156, Z-plan extrapolation model 160, and grid extension model 164 may process at least an image 116 in any order. For example, without limitation, first grid extension model 164 may be used to process at least an image 116, then Z-plan extrapolation model 160 may be used to process at least an image 116, and finally classifier model 156 may be used to process at least an image 116. In another non-limiting example, at least an image 116 may be processed using first Z-plan extrapolation model 160, then grid extension model 164, and then classifier model 156, and the like.

With continued reference to FIG. 1, input data may be transformed into a numerical representation using image vectorization, embedding, or feature extraction, to enable the machine learning model to process the data, such as at least an image 116 which may include macro image 128 and high magnification image 132. In a nonlimiting example, input data may be transformed into numerical representations using vectors and/or matrices.

A "vector" as defined in this disclosure is a data structure that represents one or more quantitative values and/or measures the position vector. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm" is a scalar value, denoted ||α|| indicating the vector's length or size, and may be defined, as a non-limiting example, according to a Euclidean norm for an n-dimensional vector a as:

$$\|a\| = \sqrt{\sum_{i=0}^{n} a_i^2}$$

Still referring to FIG. 1, processor 104 scans accepted grids 144 of the second image. Without limitation, apparatus 100 comprises Z-plane extrapolation model 160, wherein Z-plane extrapolation model 160 scans accepted grids 144 of the second image, wherein scanning accepted grids 144 of the second image may include scanning, using a predetermined sequence, each grid of accepted grids 144, estimating a first grid Z-plane of a first grid, extrapolating, using the first grid Z-plane, a second-grid Z-plane of a second grid, computing, using the first grid Z-plane and the second grid Z-plane, a Z-plane differential, and re-classifying, using the Z-plane differential, the second grid as accepted grid 144 or rejected grid 148 using a predefined Z-plane differential threshold. As used in this disclosure, a "Z-plane extrapolation model" is a model designed to predict the focal plane of one or more regions of a specimen based on a known focal plane of an adjacent or nearby region. In a non-limiting example, Z-plane extrapolation model 160 may provide an optimal focus across different areas of the specimen of slide 120. In a non-limiting example, Z-plane extrapolation model may dynamically adjust the focal plane as it move across different regions of the specimen of slide 120 to ensure focus across all areas of slide 120. Without limitation, Z-plane extrapolation model 160 provides improved focus across slide 120, more accurate results by minimizing errors and artifacts that are focus-related, and provides faster analysis of slide 120 because Z-plane extrapolation model 160 reduces the need for manual focus adjustments, thereby speeding up the imaging process. As used in this disclosure, a "predetermined sequence" is a specific predefined order or pattern in which tasks or actions are carried out. In a non-limiting example, the predetermined sequence dictates the order in which plurality of grids 124 of at least an image 116 are scanned and/or analyzed by Z-plane extrapolation model 160. For example, without limitation, Z-plane extrapolation model 160 may scan each grid of plurality of grids 124 of at least an image 116 in a specific order, such as, from left to right, top to bottom. In a non-limiting example, the predefined sequence ensures that Z-plane extrapolation model 160 analyzes all accepted grids 144 and avoids skipping or missing a grid of plurality of grids 124. Without limitation, the predefined sequence provides consistent results.

With continued reference to FIG. 1, in a non-limiting example, Z-plane extrapolation model 160 may use z-stack acquisition techniques that are the same or substantially similar to the z-stack acquisition and capturing techniques described in U.S. patent application Ser. No. 18/226,058, filed on Jul. 25, 2023, titled "IMAGING DEVICE IMAGING DEVICE AND A METHOD FOR IMAGE GENERATION OF A SPECIMEN," which is incorporated by reference herein in its entirety.

With continued reference to FIG. 1, in a non-limiting example, Z-plane extrapolation model 160 may use z-stack acquisition techniques that are the same or substantially similar to the z-stack acquisition and capturing techniques described in U.S. patent application Ser. No. 18/384,840, filed on Oct. 28, 2023, titled "APPARATUS AND METHODS FOR SLIDE IMAGING," which is incorporated by reference herein in its entirety.

With continued reference to FIG. 1, as used in this disclosure, a "first grid Z-plane" is the starting point for the focusing an imaging device in the Z-plane. In a non-limiting example, the first grid Z-plane to be analyzed by Z-plane extrapolation model 160 may be the top left corner of accepted grid 144. As used in this disclosure, a "second grid Z-plane" is a subsequent grid that is analyzed by Z-plane extrapolation model. In a non-limiting example, second grid Z-plane may include accepted grid 144 which may be subject to reclassification as rejected grid 148 based on the results of Z-plane extrapolation model 160. In a non-limiting example, the second grid Z-plane may include a neighboring grid of the first grid. As used in this disclosure, a "Z-plane differential" is the difference between the second grid Z-plane measurement and the first grid Z-plane measurement. In a non-limiting example, the Z-plane differential is used to further classify plurality of grids 124 as accepted grid 144 or rejected grid 148. In a non-limiting example, the difference between the first grid Z-plane and the second grid Z-plane may be 10 units of measurement. As used in this disclosure, a "predefined Z-plane differential" is a set threshold representing the acceptable difference in focal depth, of the Z-plane, between neighboring regions. In a non-limiting example, the predefined Z-plane differential may be a numerical value like +/−5 units. In another non-limiting example, the predefined Z-plane differential may include a percentage, such as, 10%. For example, without limitation, if the Z-plane differential is 10 units of measurement between the first grid Z-plane and the second grid Z-plane and the predefined Z-plane differential is 8 units of measurement, then the second grid may re-classified as rejected grid 148 because the Z-plane differential of 10 units of measurement is greater than the predefined Z-plane differential of 8 units of measurement. Without limitation, Z-plane extrapolation model is described more in FIGS. 4A and 4B below.

With continued reference to FIG. 1, apparatus 100 may include grid extension model 164 wherein grid extension model 164 scans accepted grids 144 of the second image, wherein scanning accepted grids 144 of the second image includes identifying a border row and a border column, and conditionally extending the grid row and the grid column of the second image as a function of the border row and the border column that includes one or more areas of interest 136.

As used in this disclosure, a "grid extension model" is a model designed to expand an area of analysis beyond the initially defined area in a systematic manner. In a non-limiting example, grid extension model 164 may use a machine learning model to analyze and determine whether content of interest 152 exists in a grid or not. In a non-limiting example, grid extension model 164 may be trained using high magnification images 132 with content of interest 152 scattered throughout plurality of grids 124. In a non-limiting example, grid extension model 164 may add rows and/or columns of grids in a predefined orderly manner. In a non-limiting example, grid extension model 164 may be designed to dynamically adjust the scope of scanning based on the findings in the initially defined grids. For example, without limitation, if grid extension model 164 detects content of interest 152 on the border row or border column of a grid, grid extension model 164 may extend the inspection area to ensure the entire content of interest 152 is captured and missed. As used in this disclosure, a "border row" is a row of elements that are located on the edge of a grid. In a non-limiting example, the grid of slide 120 may include two parallel border rows on the top and the bottom of the image. As used in this disclosure, a "border column" is a column of elements that are located on the edge of a grid. In a non-limiting example, the grid of slide 120 may include two parallel border columns one the left and one on the right of the image. Without limitation, different imaging techniques, such as high magnification, may require multiple FOVs to capture the entire grid, with typically 10s of FOVs along both the height and width of the grid of plurality of grids 124.

With continued reference to FIG. 1, in a non-limiting example, grid extension model 164 may evaluate, using presence or absence of content of interest 152 in the border fields of view, for a grid being scanned. Continuing the previous non-limiting example, grid extension model 164 may flag, using the presence of content of interest 152, the border rows and/or the border columns for grid extension. In a non-limiting example, grid extension model 164 may use classifier model 156 to flag the border rows and/or the border columns containing content of interest 152. In a non-limiting example, classifier model 156 may output a probability of specimen presence in the grid, instead of a binary output. For example, without limitation, classifier model 156 may detect a high probability of content of interest 152 in a grid in certain border rows or border columns, thereby prompting grid extension model 164 to extend the grid to include these regions for more detailed analysis. Without limitation, classifier 156 output may be useful in defining one or more areas of interest 136, filtering accepted grids 144 and rejected grids 148, and grid extension. Continuing the previous non-limiting example, grid extension model 164 may then extend, using the flags corresponding to border rows and/or border columns, the grid by one field of view outwards in direction of the flagged border rows and/or border columns. Continuing the previous non-limiting example, grid extension model 164 may scan, using the extended grid, the extended fields of view. Continuing the previous non-limiting example, grid extension model 164 may re-evaluate and scanning, using presence or absence of content of interest 152 in the border fields of view of the extended grid, until all border rows and border columns are clear of content of interest 152. Grid extension model 164 is further discussed in FIGS. 2A and 2B.

Still referring to FIG. 1, processor 104 may conditionally re-scans accepted grids 144 of the second image. In a non-limiting example, accepted grids 144 may be rescanned multiple times by image capturing device 112. Without limitation, accepted grids 144 may be later determined and re-classified as rejected grid 148.

Still referring to FIG. 1, processor 104 displays, using a display device, an output image. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user interface (GUI) to a user, wherein a user may interact with a GUI. In some cases, a user may view a GUI through display. Additionally, or alternatively, processor 104 be connected to display device. In one or more embodiments, transmitting output image 172 may include displaying output image 172 at display device 168 using a visual interface. As used in this disclosure, an "output image" is the resultant image derived from an image processing technique. In a non-limiting example, output image 172 may include content of interest 152. In another non-limited example, output image 172 may provide pertinent visual information for further analysis of slide 120 specimen. Without limitation, output image 172 may include a whole slide image, wherein the whole slide image may include content of interest 152. Without limitation, output image 172 may further include a plurality of accepted grids 144. In a non-limiting example, output image may include whole slide image 176.

With continued reference to FIG. 1, apparatus 100 may reduce scan time by avoiding scanning non-tissue areas. Additionally, and or alternatively, apparatus 100 may avoid missing tissue, especially faint ones, near the periphery of the high contract tissue. Additionally, and or alternatively, apparatus 100 may allow localization of tissue using macro images 128 in a conservative manner so as not to miss tissue. Continuing the previous example, without limitation, when some high magnification data is available, the classification of image segments may be made with more confidence.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figures 2A, 2B:
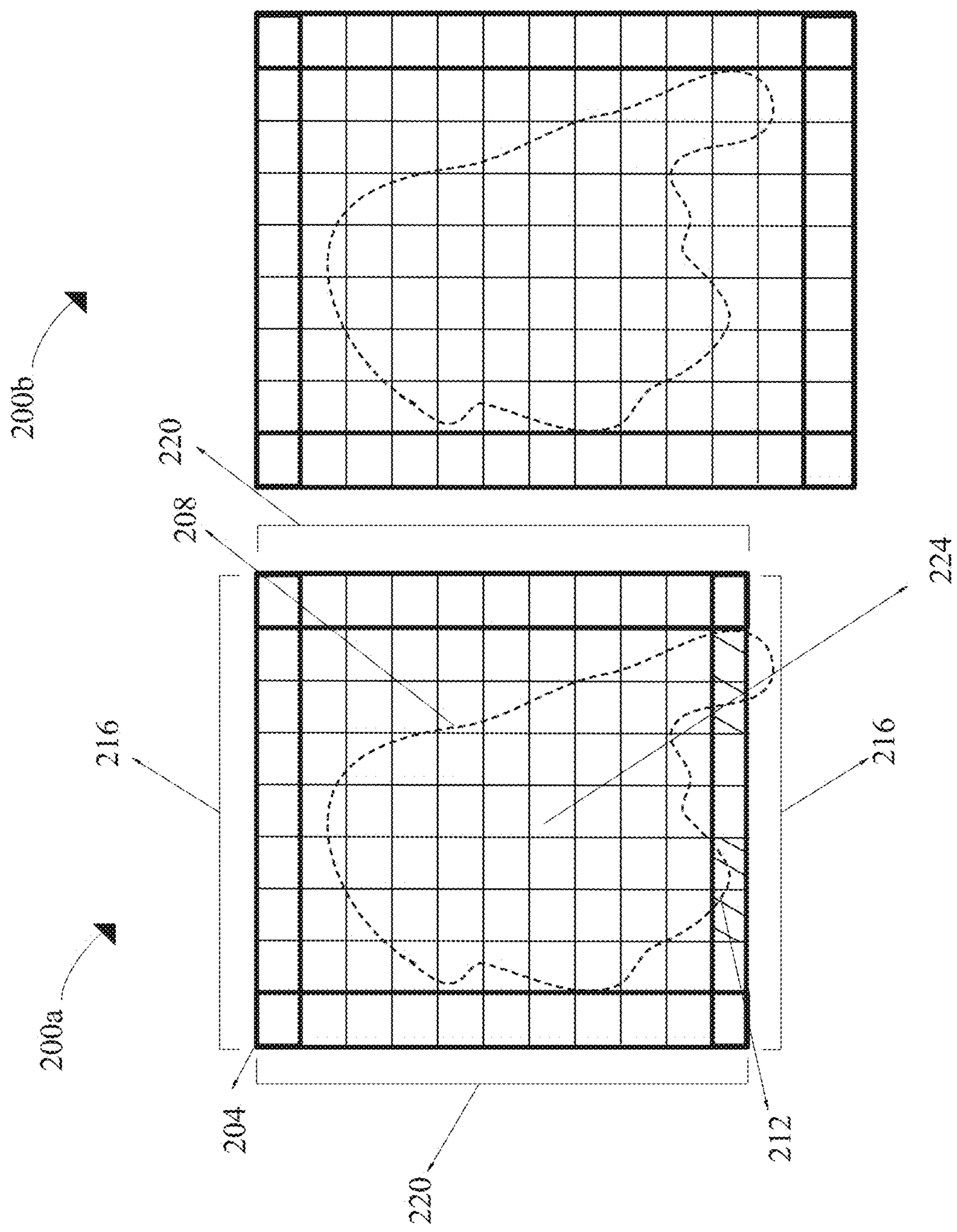
FIGS. 2A and 2B is an illustration of an exemplary embodiment for grid extension.

Referring now to FIGS. 2A and 2B, an illustration of an exemplary embodiment for grid extension, 200*a-b*.

FIG. 2A shows example grid 204 around tissue 208. In an embodiment, grid 204 extents are initially derived from analysis of an image from a macro magnification camera. In an embodiment, at high magnification, grid 204 is imaged using multiple images with the field of view (FOV) typically smaller than grid 204. In an embodiment, typically, there are 10 squares of FOV at high magnification 224 along both height and width of grid 204. In an embodiment, each FOV at high magnification 224 is evaluated to detect the presence of content of interest 212, such as, without limitation, tissue 208. In an embodiment, if it's determined that row border 216 of FOV at high magnification 224 or column border 220 of FOV at high magnification 224 have tissue 208, then it is considered as an indicator of presence of more content of interest 212 beyond grid 204 in that direction.

FIG. 2B shows the extended grid based on the example in FIG. 2A. The grid extension takes place one border row 216 or one border column 220 at a time dynamically based on the detected content. In an embodiment, the grid extension stops if the newly extended border row 216 or border column 220 is found clear of any content of interest 212. In an embodiment, this dynamic mechanism helps scanning of content of interest 212 even when macro image analysis may have missed detecting content of interest 212 presence.

Figure 3A:
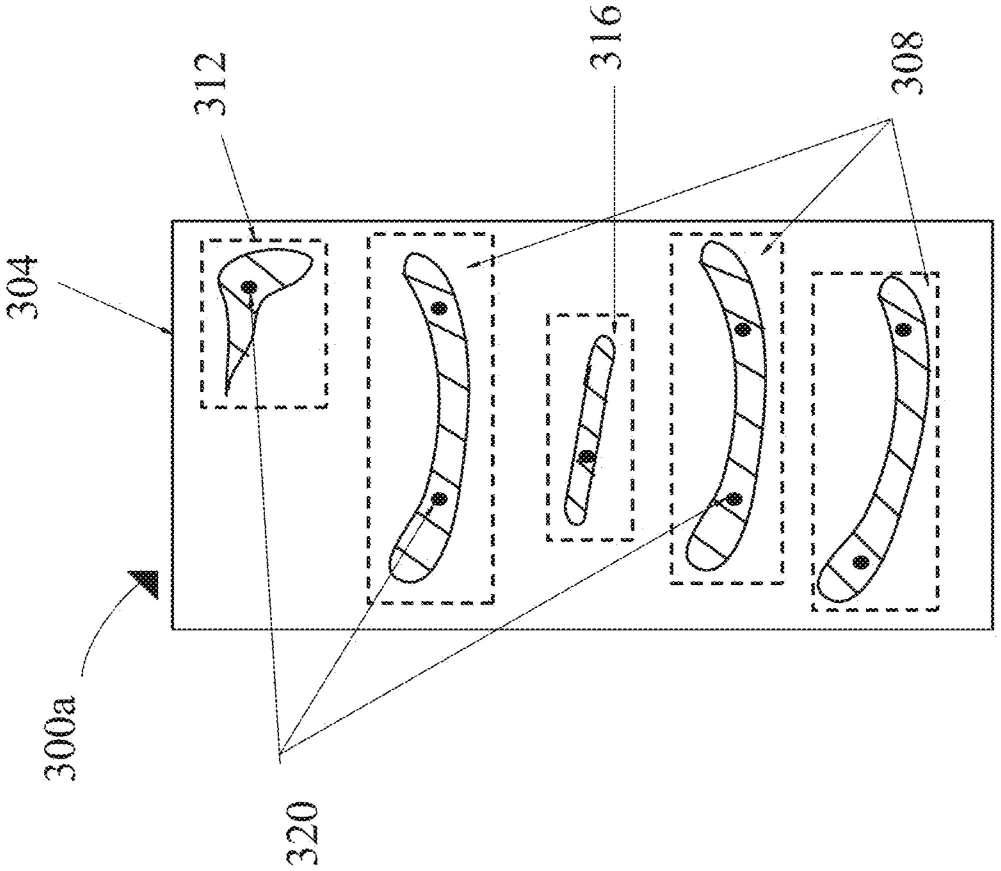
FIGS. 3A and 3B is an illustration of an exemplary embodiment of filtering using high magnification probing.
Figure 3B:
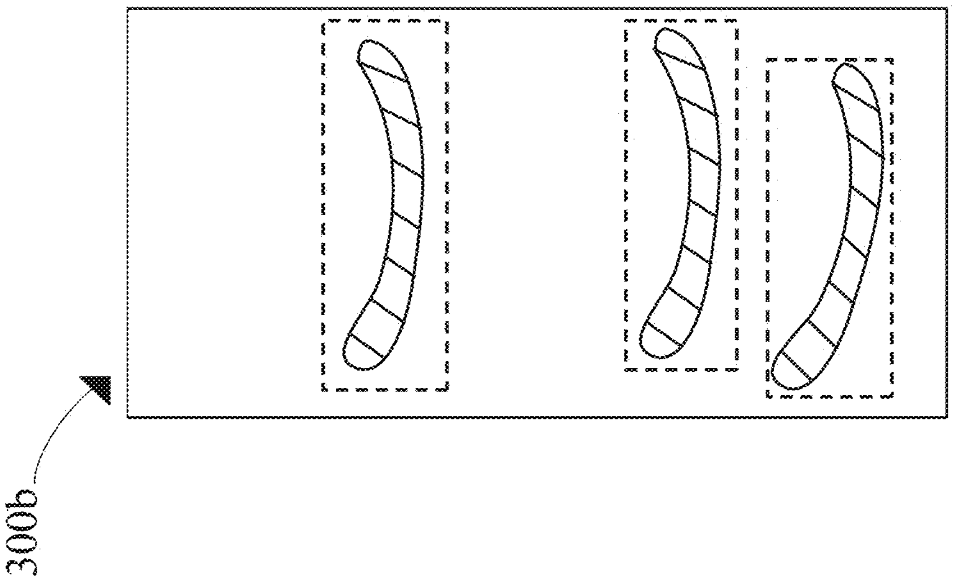

Referring now to FIGS. 3A and 3B, an illustration of an exemplary embodiment of filtering using high magnification probing, 300*a-b*.

FIG. 3A shows a macro image analysis example with contents of slide 304 determined as potential content of interest, such as tissue 308, in this case. In an embodiment, the information available at macro magnification has led to debris 312 and pen mark 316 to be included as potential content of interest. In an embodiment, at high magnification, each grid around potential content of interest is evaluated using sample points called probe points 320. In an embodiment, probe points 320 are chosen based on maximizing the probability of finding content of interest 308. In an embodiment, at each probe point 320, the image corresponding to high magnification FOV is evaluated and classified. In an embodiment, three classes may be found, such as, debris 312, pen mark 316, and tissue 308. In an embodiment, tissue class is content of interest 308 and may be retained. Continuing the previous non-limiting example, debris 312 and pen mark 316 may be classified as a rejected grid and filtered out. FIG. 3B shows only the grids that remain after grid rejection using probe points 320. In an embodiment, only the remaining grids may be scanned as part of the whole slide image.

Figure 4A:
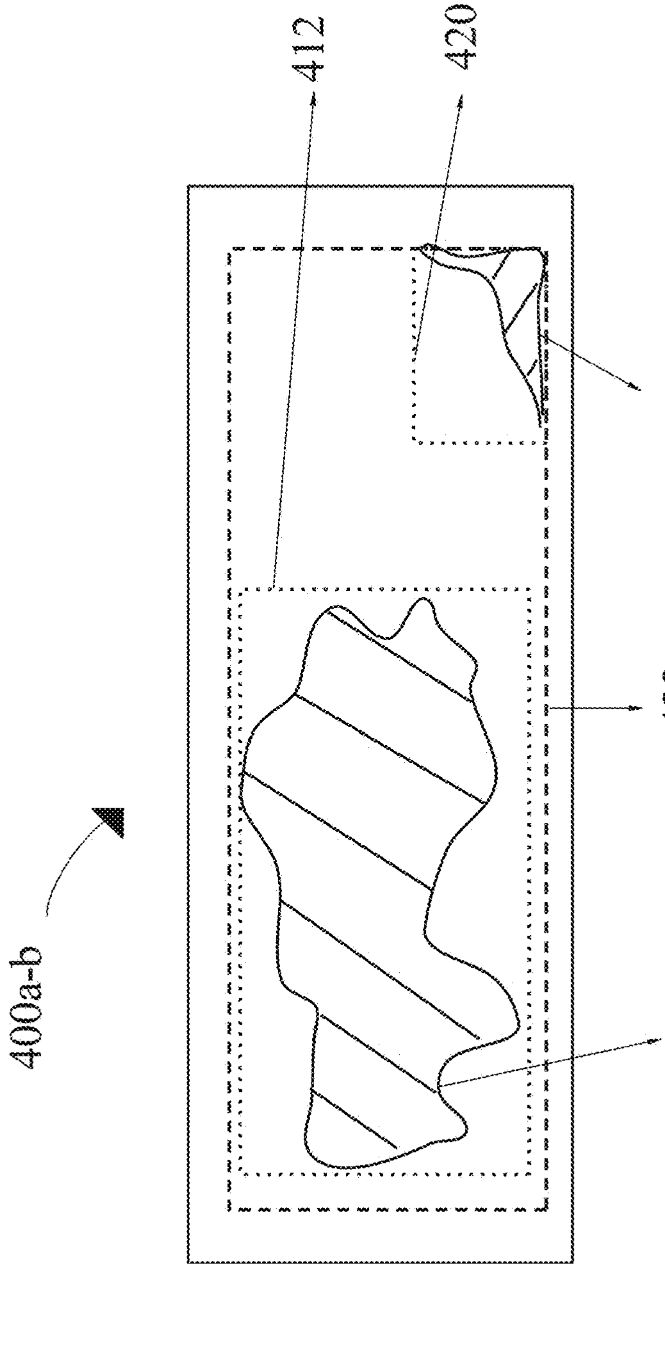
FIGS. 4A and 4B is an illustration of an exemplary embodiment of grid rejection using Z-plane extrapolation.
Figure 4B:
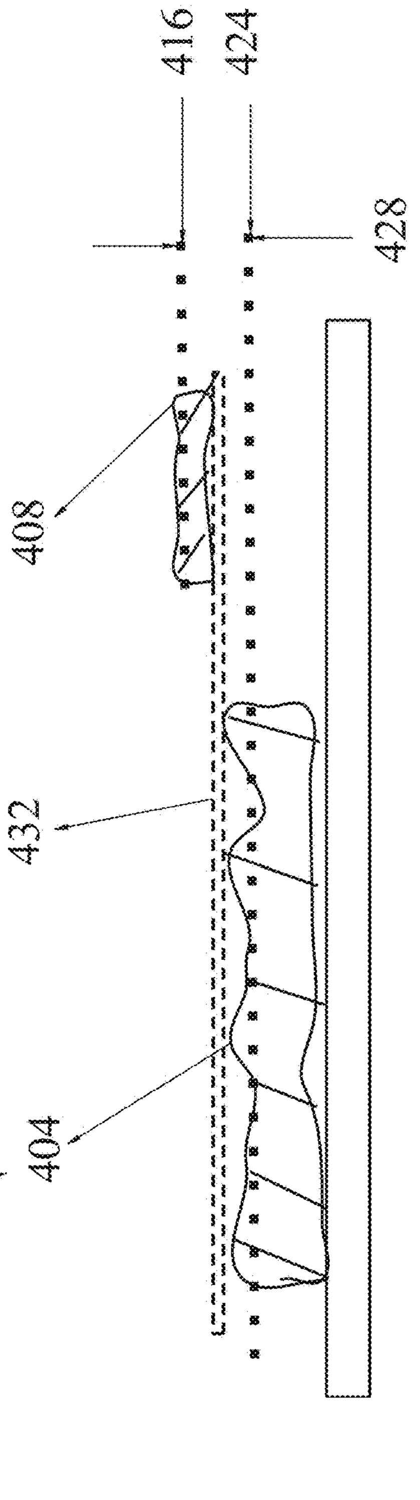

Referring now to FIGS. 4A and 4B, an illustration of an exemplary embodiment of grid rejection using Z-plane extrapolation, 400*a-b*.

FIG. 4A shows an example of tissue 404 and debris 408 on a glass slide. In an embodiment, at the macro image analysis level both tissue 404 and debris 408 might get considered as potential content of interest and with separate grids for each.

FIG. 4B shows the scenario when Grid 1 412 around tissue 404 has been scanned and measured Z-plane of tissue 404 region is known. In an embodiment, before starting the scanning of Grid 2 420, measured Z-plane 416 value can be extrapolated to, extrapolated Z-plane 424, where Grid 2 420 is located. In an embodiment, using measured Z-plane 416 value at sample points, the difference 428 between extrapolated Z-plane 424 and measured Z-plane 424 is calculated to decide whether Grid 2 420 is above coverslip 432 or below coverslip 432. In an embodiment, if the difference 428 is larger than a predefined threshold, Grid 2 420 is considered debris 408 and not scanned as part of the whole slide image.

Figure 5:
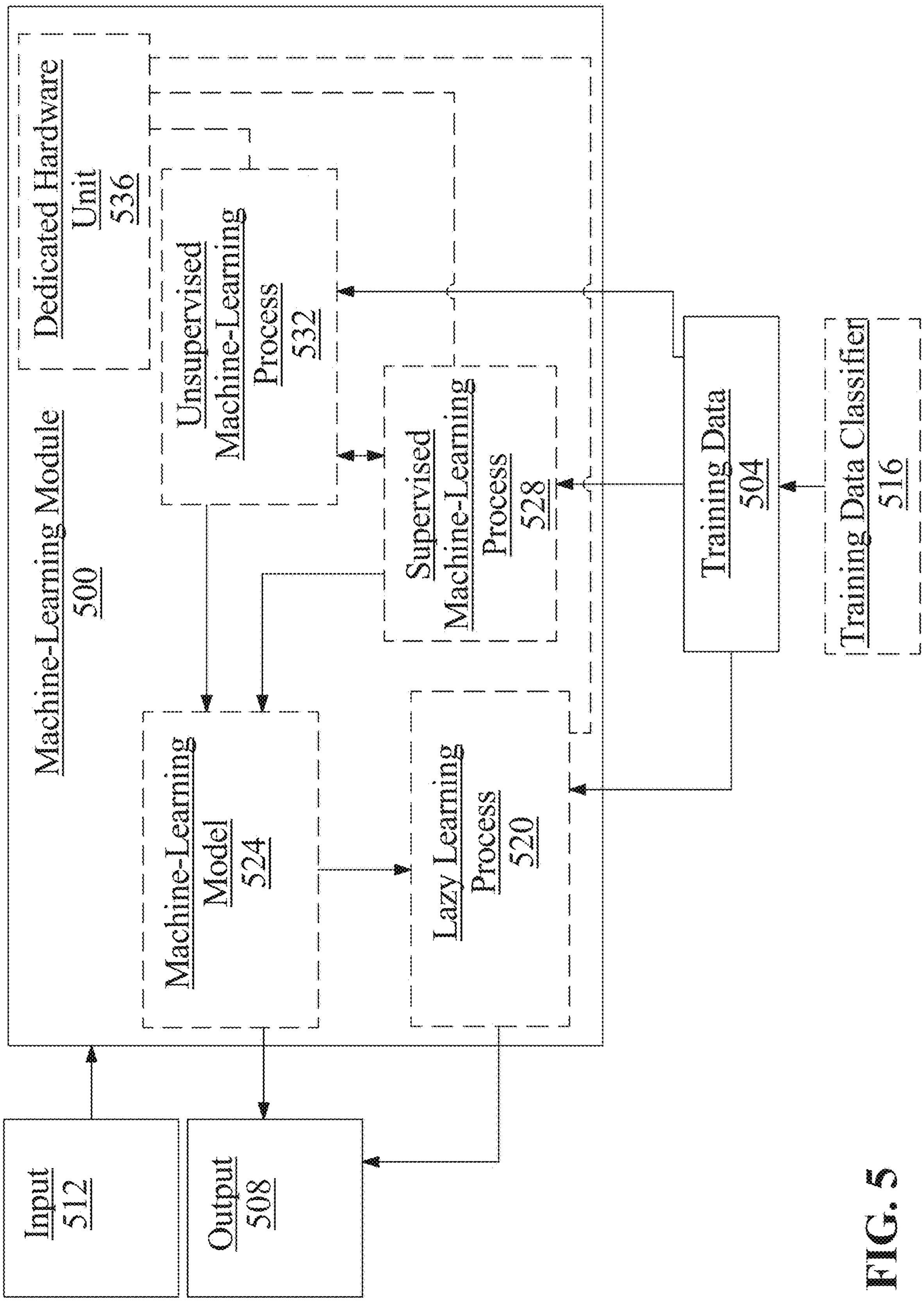
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative inputs may include at least an image, and outputs may include the content of interest as described above.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data into accepted grids or rejected grids based on the content of the grid and whether the content is content of interest.

Still referring to FIG. 5, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute to number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include at least an image, such as macro image or high magnification image as described above as inputs, content of interest grids of the at least an image as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms.

Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
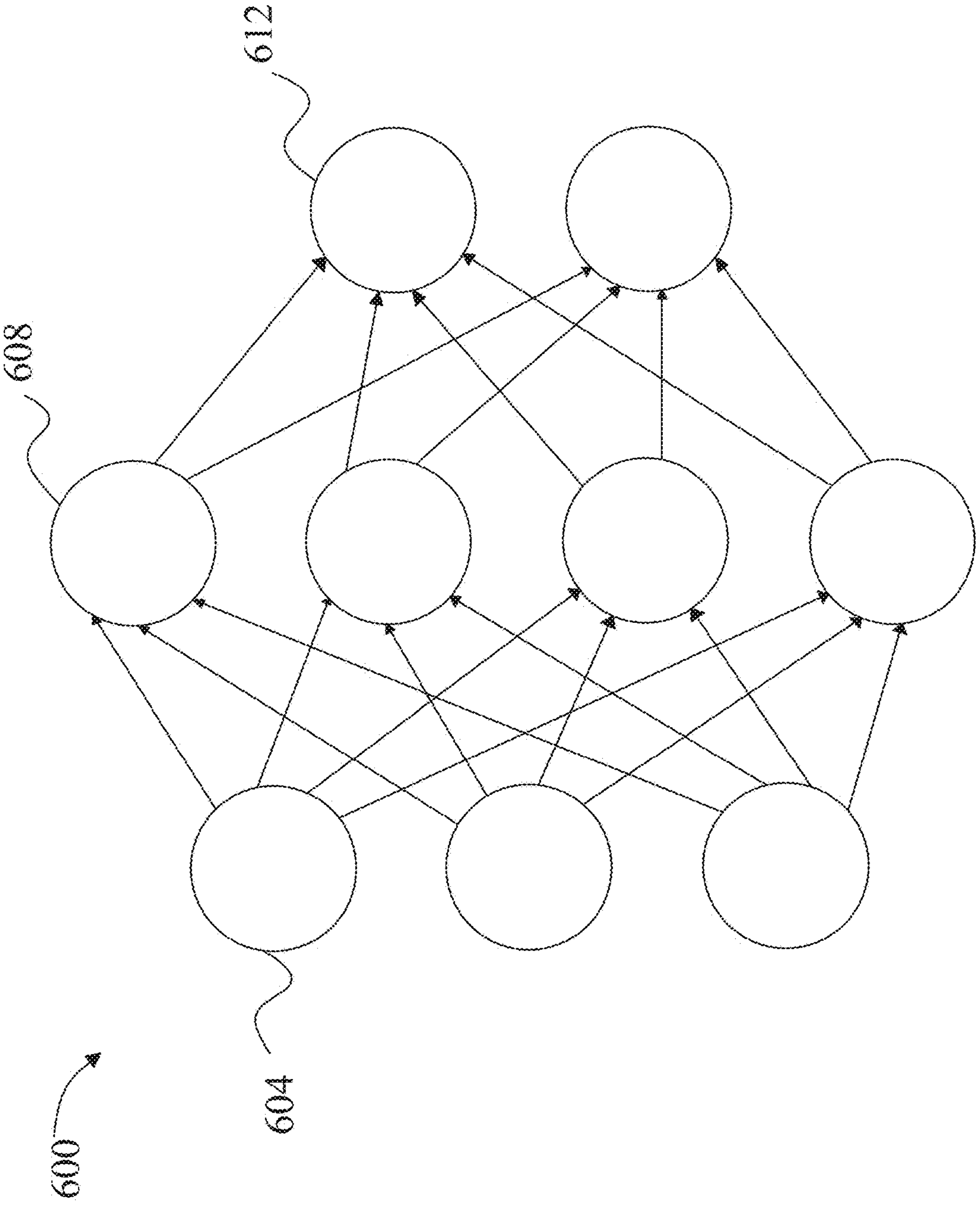
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
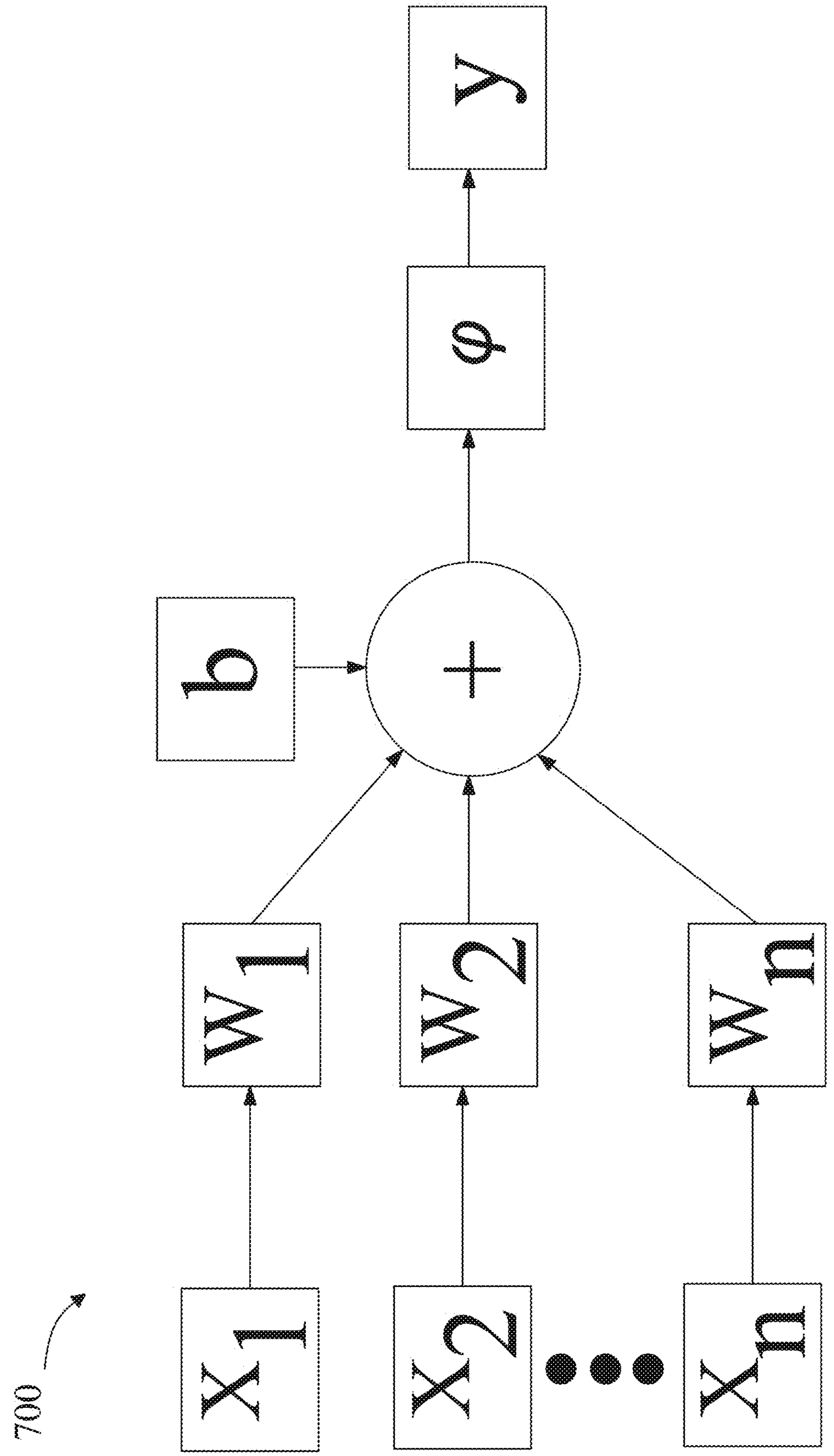
FIG. 7 is a diagram of an exemplary embodiment of a node of a neural network.

Referring now to FIG. 7, an exemplary embodiment of a node 700 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
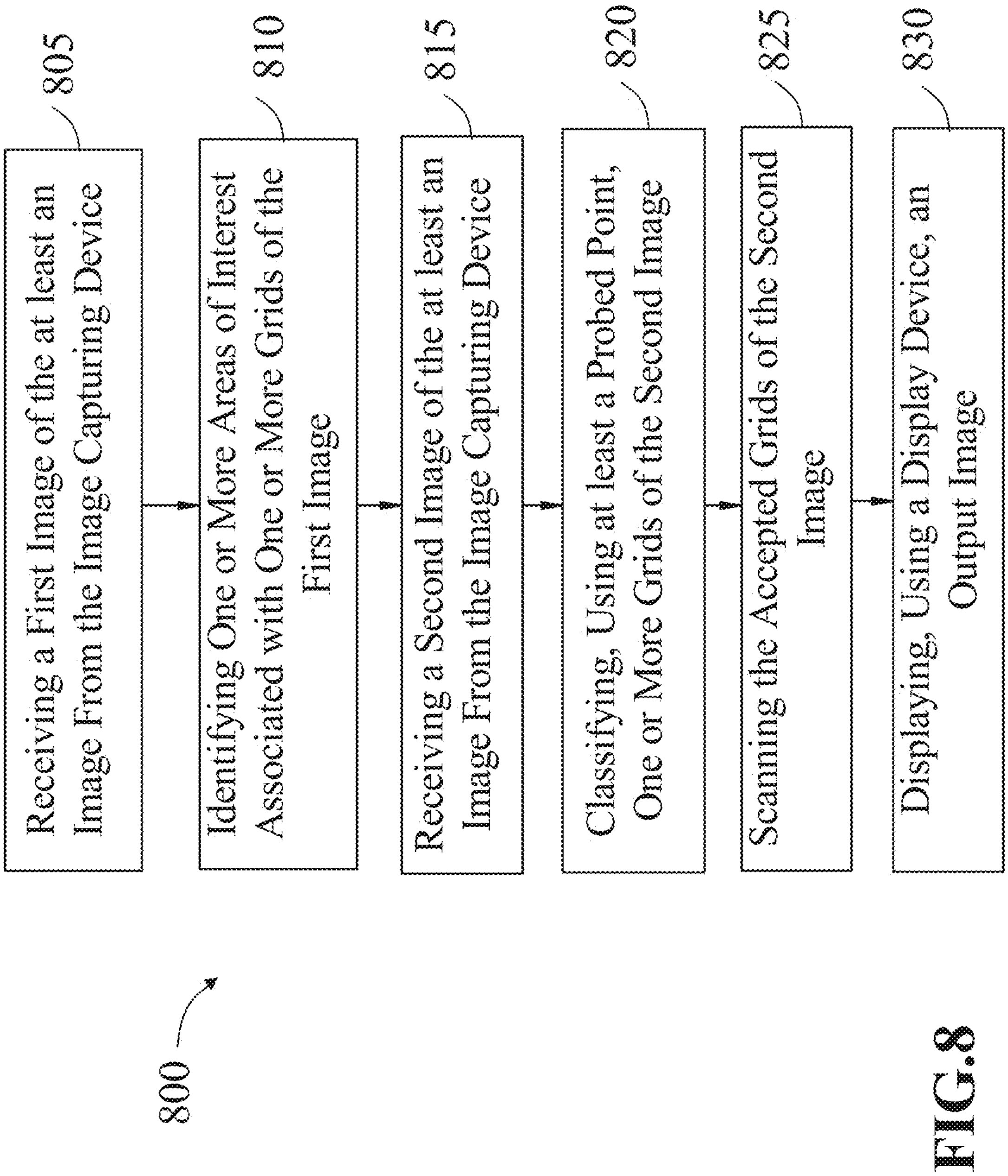
FIG. 8 is a block diagram of an exemplary method for detecting content of interest on a slide using machine learning.

Referring now to FIG. 8, a flow diagram of an exemplary method 800 for detecting content of interest on a slide using machine learning is illustrated. At step 805, method 800 includes receiving, using at least a processor, receiving a first image of the at least an image from the image capturing device, wherein the first image comprises a macro image. This may be implemented as described and with reference to FIGS. 1-7.

Still referring to FIG. 8, at step 810, method 800 includes identifying, using at least a processor, one or more areas of interest associated with one or more grids of the first image. This may be implemented as described and with reference to FIGS. 1-7.

Still referring to FIG. 8, at step 815, method 800 includes receiving, using at least a processor, a second image of the at least an image from the image capturing device, wherein the second image comprises a high magnification image associated with one or more areas of interest of the first image. This may be implemented as described and with reference to FIGS. 1-7.

Still referring to FIG. 8, at step 820, method 800 includes classifying, using at least a probed point, one or more grids of the second image, wherein classifying the plurality of grids of the second image comprises classifying the plurality of grids into accepted grids of the plurality of grids and rejected grids of the plurality of grids. This may be implemented as described and with reference to FIGS. 1-7.

Still referring to FIG. 8, at step 825, method 800 includes scanning, using at least an image capturing device, the accepted grids of the second image. This may be implemented as described and with reference to FIGS. 1-7.

Still referring to FIG. 8, at step 830, method 800 includes displaying, using a display device, the output image. This may be implemented as described and with reference to FIGS. 1-7. In an embodiment, wherein displaying the output using a display device may include a remote device, the apparatus, and or shared devices.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
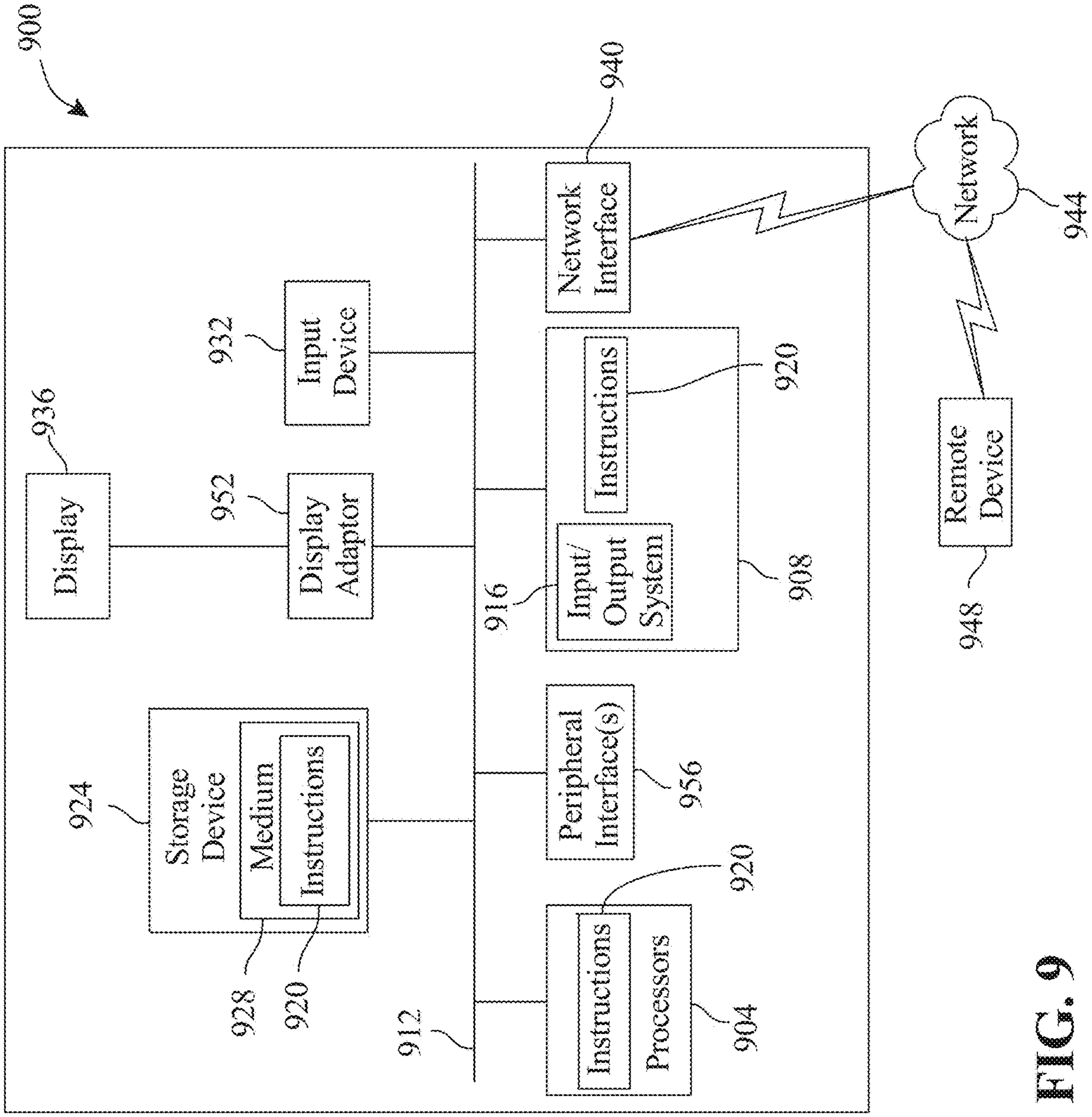
FIG. 9 is a block diagram of a computing system that can be used to implement any one or more of the methodologies disclosed herein and any one or more portions thereof.

FIG. 9 shows a diagrammatic representation of one embodiment of computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for detecting content of interest on a slide, wherein the apparatus comprises:
- an image capturing device;
- at least a computing device, wherein the computing device comprises:
  - a memory; and
  - at least a processor communicatively connected to the memory, wherein the memory contains instructions configuring the at least a processor to: scan, using the image capturing device, a first image of a received slide;
    - classify one or more grids of the first image, wherein classifying the one or more grids of the first image comprises classifying the one or more grids into one or more accepted grids of the one or more grids; and
    - scan, using the image capturing device, the one or more accepted grids to generate an output image, wherein scanning the one or more accepted grids comprises:
      - identifying a border row and a border column of the one or more accepted grids; and
      - conditionally extending, using a grid extension model, the border row and the border column of the one or more accepted grids as a function of whether the border row or the border column comprise a content of interest.

2. The apparatus of claim 1, wherein the first image comprises a macro image.

3. The apparatus of claim 1, wherein the at least a processor is further configured to display, using a display device, the output image.

4. The apparatus of claim 1, wherein the memory contains instructions further configuring the at least a processor to identify one or more areas of interest associated with one or more grids of the first image, wherein identifying the one or more areas of interest associated with the one or more grids of the first image further comprises scanning, using the image capture device, a second image of the received slide.

5. The apparatus of claim 4, wherein the second image comprises a high magnification image associated with the one or more areas of interest of the first image.

6. The apparatus of claim 1, wherein classifying the one or more grids into the one or more accepted grids of the one or more grids comprises classifying the one or more grids into the one or more accepted grids of the one or more grids and one or more rejected grids of the one or more grids.

7. The apparatus of claim 1, wherein the grid extension model comprises a machine learning model.

8. The apparatus of claim 7, wherein training the machine learning model comprises training the machine learning model using high magnification images with one or more contents of interest scattered throughout a plurality of grids.

9. The apparatus of claim 1, wherein identifying the content of interest comprises identifying the content of interest using a classifier model, wherein the classifier model is configured to classify, using at least a probe point, the content of interest.

10. The apparatus of claim 1, wherein the memory contains instructions further configuring the at least a processor to conditionally re-scan the one or more accepted grids if the content of interest is detected in the border column or the border row.

11. A method for detecting content of interest on a slide, wherein the method comprises:
- scanning, by at least a processor, a first image of a received slide using an image capturing device;

classifying, by the at least a processor, one or more grids of the first image, wherein classifying the one or more grids of the first image comprises classifying the one or more grids into one or more accepted grids of the one or more grids;

scanning, using the image capturing device, the one or more accepted grids to generate an output image;

wherein scanning the one or more accepted grids comprises:

identifying a border row and a border column of the one or more accepted grids; and conditionally extending, using a grid extension model, the border row and the border column of the one or more accepted grids as a function of whether the border row or the border column comprises a content of interest.

12. The method of claim 11, wherein the first image comprises a macro image.

13. The method of claim 11, further comprising displaying, using a display device, the output image.

14. The method of claim 11, further comprising identifying, by the at least a processor, one or more areas of interest associated with one or more grids of the first image, wherein identifying, by the at least a processor, the one or more areas of interest associated with the one or more grids of the first image further comprises scanning, using the image capture device, a second image of the received slide.

15. The method of claim 14, wherein the second image comprises a high magnification image associated with the one or more areas of interest of the first image.

16. The method of claim 11, wherein classifying the one or more grids into the one or more accepted grids of the one or more grids comprises classifying the one or more grids into the one or more accepted grids of the one or more grids and one or more rejected grids of the one or more grids.

17. The method of claim 11, wherein the grid extension model comprises a machine learning model.

18. The method of claim 17, wherein training the machine learning model comprises training the machine learning model using high magnification images with one or more contents of interest scattered throughout a plurality of grids.

19. The method of claim 11, wherein identifying the content of interest comprises identifying the content of interest using a classifier model, wherein the classifier model is configured to classify, using at least a probe point, the content of interest.

20. The method of claim 11, further comprising conditionally re-scanning the one or more accepted grids if the content of interest is detected in the border column or the border row.

* * * * *